United States Patent

Muhammad

(10) Patent No.: US 9,340,449 B1
(45) Date of Patent: May 17, 2016

(54) CERAMIC FRITS INCORPORATING CRT GLASS

(71) Applicant: Nazim Muhammad, Mississauga (CA)

(72) Inventor: Nazim Muhammad, Mississauga (CA)

(*) Notice: Subject to any disclaimer, the term of this patent is extended or adjusted under 35 U.S.C. 154(b) by 0 days.

(21) Appl. No.: 14/530,937

(22) Filed: Nov. 3, 2014

(51) Int. Cl.
*C03C 8/02* (2006.01)
*C03C 1/00* (2006.01)
*C03C 8/20* (2006.01)
*C03C 8/12* (2006.01)
*C03C 1/02* (2006.01)

(52) U.S. Cl.
CPC ... *C03C 8/20* (2013.01); *C03C 1/00* (2013.01); *C03C 1/02* (2013.01); *C03C 8/12* (2013.01); *C03C 2209/00* (2013.01)

(58) Field of Classification Search
CPC .............. C03C 1/02; C03C 8/02; C03C 8/04; C03C 8/14
See application file for complete search history.

(56) References Cited

U.S. PATENT DOCUMENTS

| | | | |
|---|---|---|---|
| 4,021,253 A | 5/1977 | Budrick et al. | |
| 4,892,847 A | 1/1990 | Reinherz | |
| 6,100,209 A | 8/2000 | Bentem et al. | |
| 6,187,255 B1 | 2/2001 | Greulich | |
| 2004/0014586 A1* | 1/2004 | Otaki | C03C 1/002 501/35 |
| 2005/0079970 A1* | 4/2005 | Otaki | C03C 1/002 501/35 |
| 2007/0298957 A1* | 12/2007 | Otaki | C03C 1/002 501/66 |
| 2008/0242527 A1* | 10/2008 | Otaki | C03C 1/002 501/35 |
| 2014/0073830 A1* | 3/2014 | Gan | C03C 14/00 588/252 |

OTHER PUBLICATIONS

Andreola "recycling of EOL CRT Glass into Ceramic Glaze Formulations and Its Enviromental Impact by LCA Approach" Int J LCA 12 (6) pp. 448-454 (2007).*

* cited by examiner

*Primary Examiner* — Karl Group
(74) *Attorney, Agent, or Firm* — Dale J. Ream

(57) ABSTRACT

Ceramic frit compositions including a cathode ray tube (CRT) glass component and methods for their manufacture are provided. Also provided are coating compositions including these ceramic frit compositions.

6 Claims, 3 Drawing Sheets

CERAMIC FRITS INCORPORATING CRT GLASS

BACKGROUND

As used herein, a ceramic frit is a ceramic composition in a powdered or granulated state. The ceramic may be a glass. Ceramic frits are conventionally obtained from the mixing of raw materials such as feldspars (which supply $Na_2O$, $K_2O$ and $SiO_2$), barium oxide (BaO), strontium oxide (SrO), and sodium oxide ($Na_2O$). The raw materials are then fused in a furnace and rapidly quenched in water. Frit compositions can be varied according to the quantities and types of oxides desired in their formulation. Frits are used mostly in the vitrifying of flooring, glazed ceramics and other ceramic products. Frits can also be used in enameling of Iron or Steel.

Several strategies have been proposed for recycling of Cathode Ray Tubes (CRTs). CRTs typically include several different types of glass. The glass of the panel portion of the CRT is predominately $SiO_2$ and often includes BaO and SrO. The glass of the funnel portion of the CRT is also predominately $SiO_2$ and often has a higher PbO content than the panel glass. Table 1 gives chemical composition ranges of panel and funnel glass for CRTs (Hreglich, S. et al. 2001, "The recycling of end of life panel glass from TV sets in glass fibers and ceramic productions". In: Dhir, K. et al. (eds) Recycling and reuse of glass cullet, Thomas Telford Publishing, London, p. 126); traces (less than 1%) of $LiO_2$, ZnO, $As_2O_3$, $TiO_2$, F and $CeO_2$ may also present.

TABLE 1

| Wt% | Panel | Funnel |
|---|---|---|
| $SiO_2$ | 59.0-64.5 | 50.30-63.80 |
| $Al_2O_3$ | 1.75-3.65 | 1.1-5.0 |
| $Na_2O$ | 5.15-9.45 | 5.3-8.3 |
| $K_2O$ | 6.0-8.5 | 6.1-10.3 |
| CaO | 0.05-4.35 | 1.05-4.45 |
| MgO | 0.1-1.75 | 0.5-3.0 |
| BaO | 2.2-13.9 | 0.05-3.7 |
| SrO | 0.2-11.6 | 0.08-1.0 |
| PbO | 0.0-2.8 | 11.0-23.6 |
| $ZrO_2$ | 0.0-3.5 | 0.0-0.5 |

Incorporation of CRT panel glass into a ceramic glaze formulation has been reported (Andreola et al., 2007, "Recycling of EOL CRT Glass into Ceramic Glaze Formulations and Its Environmental Impact by LCA Approach", Int J LCA, 12 (6) 448-454). The standard glaze formulation was stated to contain 35 wt % of glassy frit in combination with other raw materials such as clays and feldspars. Modification of this composition by substitution of 30 wt % of this frit by panel glass was reported.

BRIEF SUMMARY

In one aspect, the present invention provides ceramic frit compositions incorporating a CRT glass component. In an embodiment, the CRT glass component comprises CRT panel glass, CRT funnel glass or a combination thereof. The panel glass and/or funnel glass act as a supplier of oxides to the frit composition and thus limit the amount of raw materials needed for frit production. In an embodiment, use of CRT glass in frit formulations also allows for higher furnace productivity, reduced emission of solid particles, and improved fuel economy. Use of CRT glass in frit formulations also provides a method of recycling CRT glass. In an embodiment, the ceramic frit compositions of the invention are employed in ceramic coatings.

In an embodiment, the invention provides ceramic frit compositions comprising CRT panel glass, CRT funnel glass and an additional magnesium oxide component. In an embodiment, the ceramic frit compositions additionally comprise a calcium oxide component and/or a clay component. In an embodiment, the frit composition comprises components from the CRT glass(es) and additional MgO and CaO components. In an embodiment, the CRT glass(es) contribute $SiO_2$, $Al_2O_3$, MgO, CaO, $Na_2O$, $K_2O$, $TiO_2$, BaO, $Sb_2O_3$, ZnO, $Fe_2O_3$, PbO, SrO, $ZrO_2$ and $P_2O_5$ components. In an embodiment, the amount of $SiO_2$ in the ceramic frit composition is from 50 to 60 wt %. In an embodiment, the amount of $Al_2O_3$ is from 1 to 10 wt %. In different embodiments, the amount of MgO is from 1 to 10 wt % or from 2 to 8 wt %. In different embodiments, the amount of CaO is from 2 to 15 wt % or from 4 to 12 wt %. In different embodiments, the amount of $Na_2O$ is from 2 to 10 wt % or from 4.5 to 6.5 wt %. In different embodiments, the amount of $K_2O$ is from 2 to 10 wt % or from 4.5 to 6.5 wt %. In an embodiment, the amount of BaO is from 2 to 5 wt %. In an embodiment, the amount of $Fe_2O_3$ is from 0.5 to 2 wt %. In different embodiments, the amount of PbO is from 2 to 10 wt %, 3 to 8 wt % 4 to 8 wt % or from 5 to 8 wt %. In an embodiment, the amount of SrO is from 2 to 6 wt %. In an embodiment, the amounts of $TiO_2$, $Sb_2O_3$, ZnO, $ZrO_2$ and $P_2O_5$ are each less than 1 wt %. In an embodiment, the amount of PbO is minimized.

In an embodiment, the frit composition prior to fusion comprises panel glass, funnel glass, dolomite and optionally kaolin. In different embodiments, the amount of panel glass is from 40-60 wt % or 45-55 wt %. In different embodiments, the amount of funnel glass is from 15-35 wt % or from 20-30 wt %. In different embodiments, the amount of dolomite is from 5-30 wt % or from 9-25%. In different embodiments, the amount of kaolin is from 0-20 wt %, 5-15 wt % or 10-20 wt %.

In another aspect, the invention provides methods for making the ceramic frits of the invention. In an embodiment, the ceramic frits are made by mixing CRT glass with other natural raw materials, melting the mixture and quenching the molten mixture. In an embodiment, the fusion temperature of the ceramic frits of the invention is less than 1450° C. In an embodiment, the temperature of the quenching liquid is from 43 to 99° C. (110 F to 210 F). In an embodiment, the quenching liquid is water. In an embodiment the pH of the water is from 6.0 to 9.0. In an embodiment, the conductivity of the water is 150 micro-mhos/cm to 1500 micro-mhos/cm. In an embodiment, the particle or grain size of the quenched frits is from 10 to 50 mm. If desired, the quenched frit material may be ground to further reduce the particle size.

In another aspect, the invention provides coating compositions comprising the ceramic frits of the invention. In an embodiment, the invention provides coating compositions suitable for use as an engobe or underglaze. In an embodiment, coating compositions suitable for use as an engobe or underglaze comprise 15-35 wt % or 20-30 wt % of the ceramic frits of the invention, 30 to 50% of a clay component, 20 wt % of quartz and 15 wt % of kaolin. In another embodiment, the invention provides coating compositions suitable for use as a cover coat or glaze. In an embodiment, the coating compositions suitable for use as a glaze comprise 80-95 wt %, or 85-95 wt % of the ceramic frits of the invention and 5-15% titanium oxide (e.g. titanium dioxide).

In an embodiment, the coating composition is applied to a piece and then fired at elevated temperature. In an embodiment, the firing temperature is from 1000 to 1100° C. In an embodiment, the engobe coating and the cover coating are fired together.

DETAILED DESCRIPTION OF THE INVENTION

Figure 1:
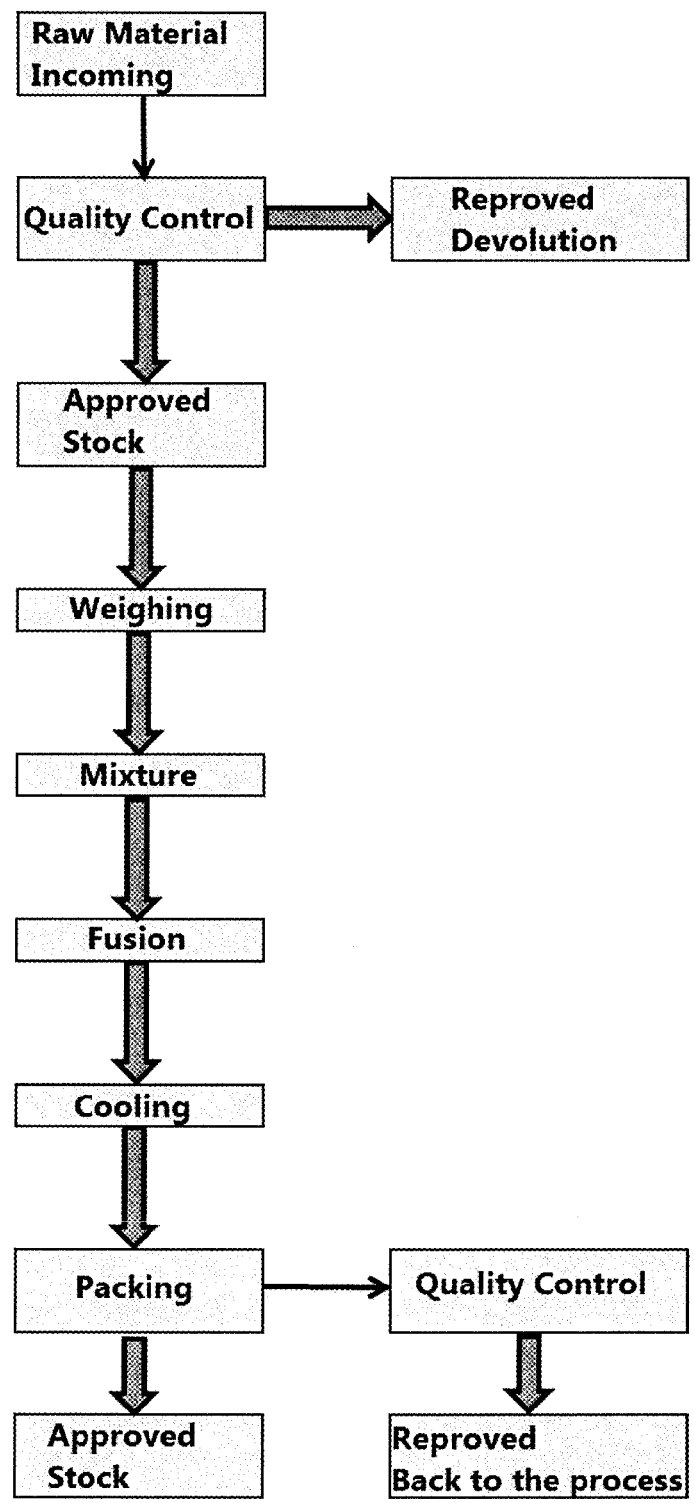
FIG. 1 provides a diagram of a simplified manufacturing process.

The ceramic frits of the invention are characterized by a lead content which is reduced as compared to the lead content in the CRT glass component. In addition, the solubility index of the frits is reduced as compared to the CRT glass component, thereby reducing the possibility of leaching of lead from the frit. Without wishing to be bound by any particular belief, the reduced solubility may be due to formation of a compound including lead and magnesium such as magnesium plumbate ($MgPbO_3$). In an embodiment, the solubility can be measured by ball milling the frit (e.g. to 30 mesh), mixing with water, filtering the water and using atomic absorption to determine the amount of metals present in the water. The temperature used to form the molten mixture can vary depending upon the formulation of the batch used to form the ceramic frit. In an embodiment, the batch is exposed to a temperature from 1350 to 1450° C.

Certain frit and coating compositions of invention include a clay component. Suitable clays include, but are not limited to, kaolin and ball clay. Clay minerals include minerals composed of silica, alumina or magnesia or both and water, such as kaolinite ($2SiO_2.Al_2O_3.2H_2O$).

Certain frit and coating compositions of invention include a source of magnesium oxide. Suitable sources of or starting materials for magnesium oxide include magnesium carbonate, magnesia and calcium magnesium carbonate (dolomite ($CaMg(CO_3)_2$).

Certain frit and coating compositions of invention include a source of calcium oxide. Suitable sources of or starting materials for calcium oxide include calcium carbonate ($CaCO_3$), calcium hydroxide and calcium magnesium carbonate. Natural sources include whiting (calcium carbonate), limestone, wollastonite (calcium silicate, $CaSiO_3$), Colemanite ($CaB_3O_4(OH)_3.H_2O$, wood ash, bone ash, and dolomite.

As is known to the art, engobe is a background coating applied to a ceramic piece (for example a compressed clay already shaped ceramic tile). The engobe coatings serve to cover the piece, regulating the surface and blanching the piece.

The cover coat is the final coat applied to the piece. For example, the cover coat can give glazing of ceramic tiles. The cover coat can be colored, white, matte, etc. Optional additives for the cover coat include an opacifier, such as zirconium oxide (e.g. zirconium dioxide) or titanium oxide (e.g. titanium dioxide).

All references cited herein are hereby incorporated by reference to the extent not inconsistent with the disclosure herewith.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

Although the description herein contains many specificities, these should not be construed as limiting the scope of the invention but as merely providing illustrations of some of the presently preferred embodiments of the invention. For example, thus the scope of the invention should be determined by the appended claims and their equivalents, rather than by the examples given.

The invention may be further understood by the following non-limiting examples.

EXAMPLE 1

Manufacture of Ceramic Frits

Manufacturing Process
Quality Control of Raw Materials Used
All raw materials used in the manufacture are controlled as to: 1—Color Burn; 2—Fusibility; 3—Grain Size and 4—Chemical Analysis (usually guaranteed by the supplier)

Weighing and Mixing
The raw materials are stored, weighed out and mixed as per the formulation to be used to form furnace feed material known as batch and mixed for approximately 20 minutes.

After this, the batch is discharged from the mixer and transferred to the feeding unit of the fusion furnace by mechanical transport, either by bucket elevator, conveyor or other means.

Fusion
The fusion is done in a continuous furnace fed by a screw conveyor with adjustable speed. The volume of the feed mixture and the temperature is dependent upon the formulation that is being produced. In an embodiment, the temperature is between 1350 to 1450 degrees Celsius.

The furnace is fired by natural gas with oxygen. The gas-$O_2$ mixture and temperature is monitored and controlled by Programmable Logic Controller with the help of the thermocouple installed in the oven.

A secondary burner with lean mixture ($O_2$-natural gas) without automatic control is installed in the outlet nozzle of the oven just to keep the molten glass at high temperature until it reaches the cooling trough.

The combustion gases are extracted by a chimney and bag house filter before being released to the atmosphere, thus preventing any particulate emissions.

Cooling
The molten glass mixture (now liquid), is continuously discharged in a vibratory quencher with running water. The temperature, pH and conductivity of the water is monitored and controlled. With the heat shock the liquid glass solidifies into lumps of glass, technically named ceramic frit.

The inclined vibrating quencher discharges the frit in big bags, practically without water. The samples are taken for quality control of the final product.

Control of Water

Upon leaving the cooling quencher, the hot water passes through a vibratory sieve (to remove solid waste), and transferred to the cooling tower and settling box where the temperature, pH and conductivity is adjusted before returning to the circuit.

Solid Wastes

All solid waste generated in the manufacturing process, whether the mixer exhaust and others, sieve of the cooling water, the settling box and bag filters, are reused in the mixture and recast process, thus not generating any residue to be disposed.

Quality Control of Final Product (Frit)

The frit is controlled as fusibility, color burn, transparency or opacity.

In case some batches are out of quality, they can be remixed with other batches (there is a range of tolerance allowed by customers), or returned to mixing and fusion.

Figure 2:
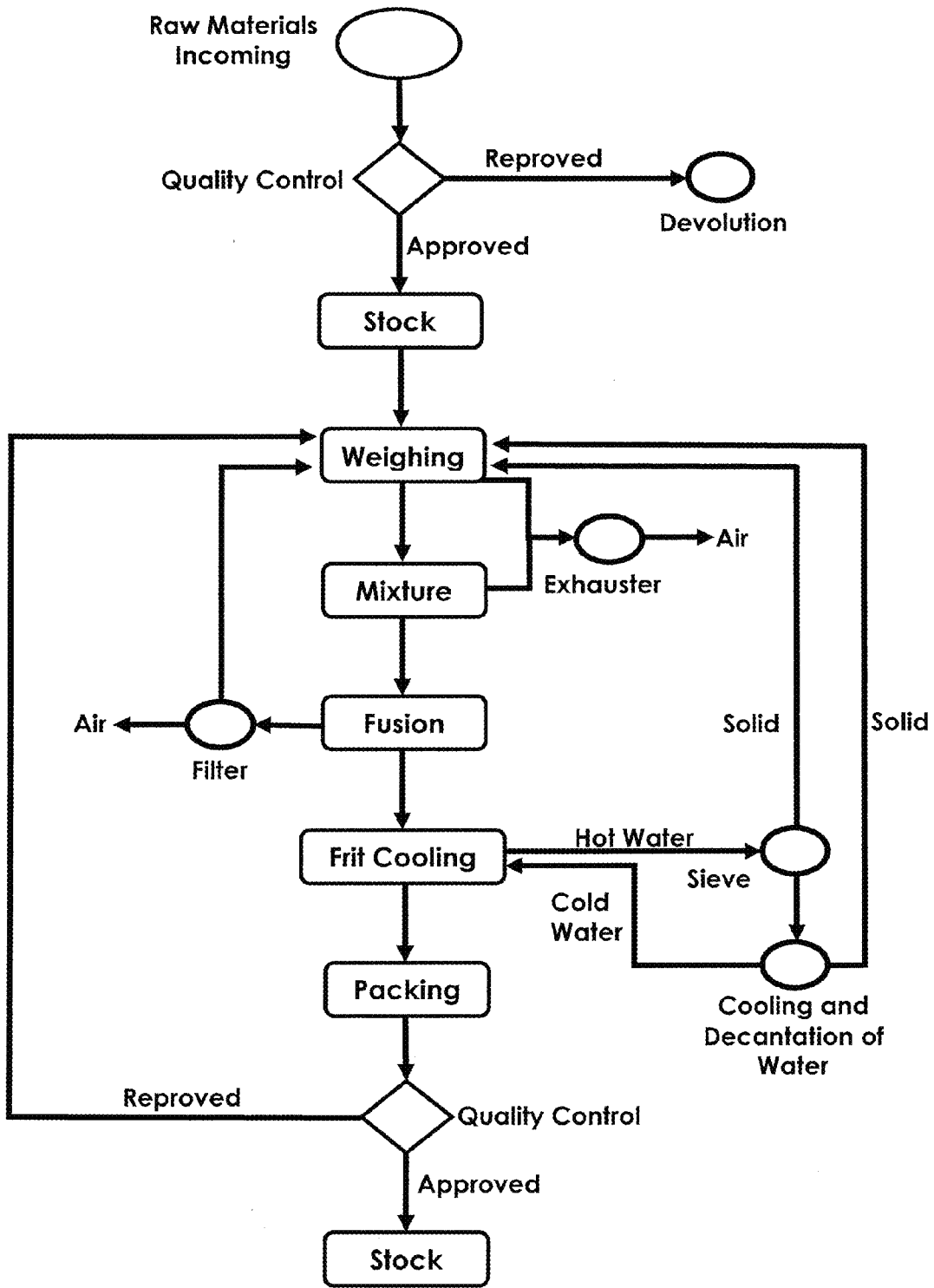
FIG. 2 provides a diagram of a more detailed manufacturing process.

FIG. 1 illustrates a simplified manufacturing process while FIG. 2 illustrates a complete manufacturing process.

Table 2 gives exemplary compositions for the CRT glass component and several ceramic frits. Table 3 gives formulations for the CRT glass component and several ceramic frits. Table 4 gives solubility data for the CRT glass component and several ceramic frits.

TABLE 2

| OXIDE | CRT % | FRIT A % | FRIT B % | FRIT C % |
| --- | --- | --- | --- | --- |
| $SiO_2$ | 63.067 | 53.735 | 57.223 | 58.716 |
| $Al_2O_3$ | 1.790 | 1.525 | 5.986 | 7.894 |
| MgO | 0.843 | 6.882 | 4.000 | 2.767 |
| CaO | 2.140 | 10.457 | 6.392 | 4.652 |
| $Na_2O$ | 6.770 | 5.768 | 5.548 | 5.454 |
| $K_2O$ | 6.663 | 5.677 | 5.518 | 5.450 |
| $TiO_2$ | 0.050 | 0.043 | 0.043 | 0.044 |
| BaO | 4.223 | 3.598 | 3.450 | 3.387 |
| $Sb_2O_3$ | 0.177 | 0.151 | 0.144 | 0.142 |
| ZnO | 0.013 | 0.011 | 0.011 | 0.011 |
| $Fe_2O_3$ | 1.217 | 1.037 | 1.025 | 1.020 |
| PbO | 7.387 | 6.294 | 6.035 | 5.924 |
| SrO | 4.553 | 3.880 | 3.720 | 3.652 |
| $ZrO_2$ | 1.000 | 0.852 | 0.817 | 0.802 |
| $P_2O_5$ | 0.107 | 0.091 | 0.087 | 0.086 |

TABLE 3

| FORMULA RAW MATERIAL | CRT % | FRIT A % | FRIT B % | FRIT C % |
| --- | --- | --- | --- | --- |
| PANEL | 66.67 | 50.00 | 50.00 | 50.00 |
| FUNNEL | 33.33 | 25.00 | 25.00 | 25.00 |
| KAOLIN | — | — | 11.00 | 16.00 |
| DOLOMITE | — | 25.00 | 14.00 | 9.00 |
| LIMESTONE | — | — | — | — |
| TOTAL | 100.00 | 100.00 | 100.00 | 100.00 |
| YIELD | 100.0% | 88.0% | 91.8% | 93.5% |

TABLE 4

|  | CRT | FRIT A | FRIT B | FRIT C |
| --- | --- | --- | --- | --- |
| SOLUBILITY | 0.192 | 0.16 | 0.134 | 0.133 |
| PbO Mol | 0.096 | 0.047 | 0.051 | 0.050 |

EXAMPLE 2

Engobe and Cover Formulations

The engobe coating compositions are formulated with approximately 25% of frit, ground and mixed with other raw materials, and applied to the piece in a layer about 300 gram per square meter.

The cover coating compositions are made with approximately 90% of frit, ground and mixed with other raw materials and applied to the piece with engobe already applied, in a layer about 220 gram per square meter.

The ceramic tiles are fired or burned at a temperature of approximately 1050 degrees Celsius, to achieve the required consistence and fix the engobe and the cover on the ceramic tiles.

Figure 3:
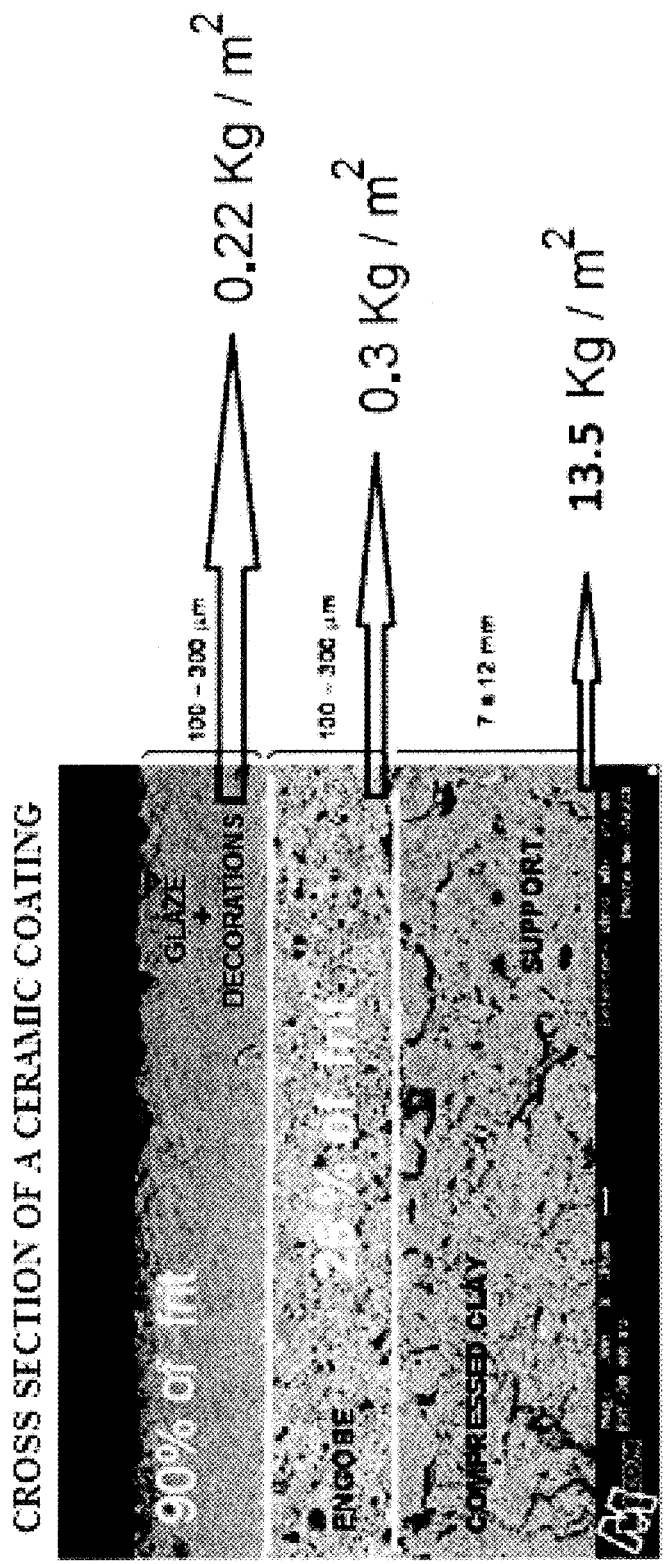
FIG. 3 shows a cross-sectional view of an engobe layer and a glaze and decoration layer applied to a compressed clay support.

FIG. 3 shows a cross-sectional view of an engobe layer and a glaze and decoration layer applied to a compressed clay support.

Accordingly, the application of the frit at the end product is a very small percentage. The one square meter of ceramic tiles has the weight of approx 14 kg, approx 13.5 kg of clay, 0.3 kg of Engobe (0.075 kg frit) and 0.22 kg of coverage (0.198 kg of frit). In summary, the formations we are presenting, we have the sum of the two layers: panel glass=0.13 gram, funnel glass=0.068 grams in the total of 14 kg of product.

The invention claimed is:

1. A method for making a ceramic frit comprising the steps of:
    a) forming a mixture comprising 40-60 wt % CRT panel glass, 15-35 wt % CRT funnel glass and 5-30 wt % dolomite;
    b) melting the mixture of step a) to form a molten mixture; and
    c) quenching the molten mixture of step b) in a liquid, thereby forming the ceramic frit.

2. The method of claim 1 wherein the mixture of step a) further comprises greater than zero and less than 20 wt % kaolin.

3. The method of claim 1, wherein in step b) the mixture of step a) is melted by exposure to a temperature from 1350 to 1450° C.

4. The method of claim 1, wherein in step c) the temperature of the liquid is from 43 to 99° C.

5. The method of claim 1, wherein in step c) the liquid is water and the pH of the water is from 6.0 to 9.0.

6. The method of claim 1, wherein in step c) the liquid is water and the conductivity of the water is from 150 micro-mhos/cm to 1500 micro-mhos/cm.

* * * * *